United States Patent
Dorneich et al.

(10) Patent No.: US 9,349,295 B2
(45) Date of Patent: May 24, 2016

(54) MIXED-INTIATIVE TRANSFER OF DATALINK-BASED INFORMATION

(75) Inventors: Michael Christian Dorneich, Saint Paul, MN (US); Stephen Whitlow, St. Louis Park, MN (US); William Rogers, Minneapolis, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 912 days.

(21) Appl. No.: 13/005,241

(22) Filed: Jan. 12, 2011

(65) Prior Publication Data

US 2012/0078448 A1 Mar. 29, 2012

Related U.S. Application Data

(60) Provisional application No. 61/386,789, filed on Sep. 27, 2010.

(51) Int. Cl.
*G06F 7/00* (2006.01)
*G08G 5/00* (2006.01)
*G08B 21/06* (2006.01)

(52) U.S. Cl.
CPC .............. *G08G 5/0013* (2013.01); *G08B 21/06* (2013.01); *G08G 5/0021* (2013.01); *G08G 5/0086* (2013.01); *G08G 5/0091* (2013.01)

(58) Field of Classification Search
CPC . G08G 5/0013; G08G 5/0021; G08G 5/0086; G08G 5/0091; G08B 21/06
USPC ........ 701/3, 14, 400, 408–413, 418; 340/945, 340/947–948, 971
See application file for complete search history.

(56) References Cited

U.S. PATENT DOCUMENTS

| | | | | |
|---|---|---|---|---|
| 5,075,881 | A * | 12/1991 | Blomberg et al. | 703/2 |
| 6,163,744 | A | 12/2000 | Onken et al. | |
| 7,177,731 | B2 * | 2/2007 | Sandell et al. | 701/3 |
| 7,257,469 | B1 * | 8/2007 | Pemble | 701/3 |
| 7,363,119 | B2 * | 4/2008 | Griffin et al. | 701/3 |
| 7,437,225 | B1 * | 10/2008 | Rathinam | 701/14 |
| 7,454,313 | B2 * | 11/2008 | Whitlow et al. | 702/182 |
| 7,463,955 | B1 | 12/2008 | Robinson et al. | |
| 7,742,847 | B2 * | 6/2010 | DeMers et al. | 701/14 |
| 7,747,360 | B2 | 6/2010 | Canu-Chiesa et al. | |
| 2002/0111720 | A1 * | 8/2002 | Holst et al. | 701/3 |

(Continued)

OTHER PUBLICATIONS

EP Communication for EP 11182060.1-1232 dated Dec. 20, 2012.

(Continued)

*Primary Examiner* — John Q Nguyen
*Assistant Examiner* — Anshul Sood
(74) *Attorney, Agent, or Firm* — Ingrassia Fisher & Lorenz, P.C.

(57) ABSTRACT

A system and method are provided for transferring datalink-based information into an aircraft flight management system. When a datalink message is received in an aircraft, it is parsed into individual information elements. The operational impact of the received datalink message on the aircraft is determined from the individual information elements. A method of supplying pilot feedback regarding the received datalink message is determined from the determined operational impact. The pilot feedback regarding the received datalink message is supplied using the determined method. At least selected portions of the individual information elements are selectively transferred into the aircraft flight management system (FMS).

20 Claims, 2 Drawing Sheets

(56) References Cited

U.S. PATENT DOCUMENTS

| | | |
|---|---|---|
| 2003/0229603 A1* | 12/2003 | Childress et al. ............... 706/11 |
| 2005/0030184 A1 | 2/2005 | Victor |
| 2006/0220883 A1 | 10/2006 | Matos |
| 2007/0063855 A1 | 3/2007 | Maass |
| 2007/0219679 A1* | 9/2007 | Coulmeau ......................... 701/3 |
| 2007/0220109 A1 | 9/2007 | Nelson et al. |
| 2008/0103646 A1 | 5/2008 | Lucas et al. |
| 2008/0109160 A1 | 5/2008 | Sacle et al. |
| 2008/0114504 A1* | 5/2008 | Goodman et al. ................ 701/3 |
| 2008/0243319 A1* | 10/2008 | Coulmeau et al. .............. 701/14 |
| 2009/0089693 A1 | 4/2009 | Fahy |
| 2009/0177342 A1* | 7/2009 | Gutierrez-Castaneda ...... 701/11 |
| 2009/0207048 A1* | 8/2009 | He et al. ........................ 340/973 |
| 2010/0145605 A1 | 6/2010 | Valex et al. |

OTHER PUBLICATIONS

European Patent Office, Extended European Search Report for Application No. 11 182 060.1 dated Oct. 16, 2012.

Duric Z. et al, Proceedings of the IEEE, vol. 90, No. 7, Jul. 2002:"Integrating Perceptual and Cognitive Modeling for Adaptive and Intelligent Human-Computer Interaction".

Vernaleken et al., SPIE Digital Library 2008, vol. 6957 :"Considerations on symbology, data requirements and operational concept for integral NOTAM visualtization on airport moving map displays".

* cited by examiner

MIXED-INTIATIVE TRANSFER OF DATALINK-BASED INFORMATION

PRIORITY CLAIMS

This application claims the benefit of U.S. Provisional Application No. 61/386,789 filed Sep. 27, 2010.

TECHNICAL FIELD

The present invention generally relates to datalink messaging, and more particularly relates to a system and method for at least selectively transferring data included in datalink messages directly into an aircraft flight management system.

BACKGROUND

Datalink messaging provides an additional channel of communication for pilots, and provides enhanced information flow to and from the flight deck. Indeed, datalink messaging technologies are supplanting traditional radio transmissions as the primary means of communication between aircraft and ground facilities (e.g., air traffic control). However, datalink messaging may adversely impact pilot workload and attention. In particular, recent research suggests that pilot workload may increase due to increased interaction with a display device that is configured to render received datalink messages. Moreover, frequent datalink messages may be a source of pilot distraction on the flight deck. One task that is often initiated in response to receipt of a datalink message is the transfer of information in the datalink message into the aircraft flight management system (FMS). This can be relatively time consuming and is potential source of human error.

Hence, there is a need for a system and method to efficiently transfer datalink message information into the aircraft FMS, and do so in a manner that maximizes pilot awareness of the information transfer and the operational impact thereof. The present invention addresses at least this need.

BRIEF SUMMARY

In one embodiment, a method for transferring datalink-based information into an aircraft flight management system includes receiving a datalink message in an aircraft, and parsing the received datalink message into individual information elements. The operational impact of the received datalink message on the aircraft is determined from the individual information elements. A method of supplying feedback to the pilot regarding the received datalink message is determined from the determined operational impact. The feedback to the pilot regarding the received datalink message is supplied using the determined method. At least selected portions of the individual information elements are selectively transferred into the aircraft flight management system (FMS).

In another embodiment, an avionics system includes a receiver and a processor. The receiver is configured to receive a datalink message. The processor is in operable communication with the receiver and is configured to parse each of the received datalink message into individual information elements, determine, from the individual information elements, the operational impact of the received datalink message on the aircraft, determine, from the determined operational impact, a method of supplying pilot feedback regarding the received datalink message, and selectively transfer at least selected portions of the individual information elements into the aircraft flight management system (FMS).

Furthermore, other desirable features and characteristics will become apparent from the subsequent detailed description, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
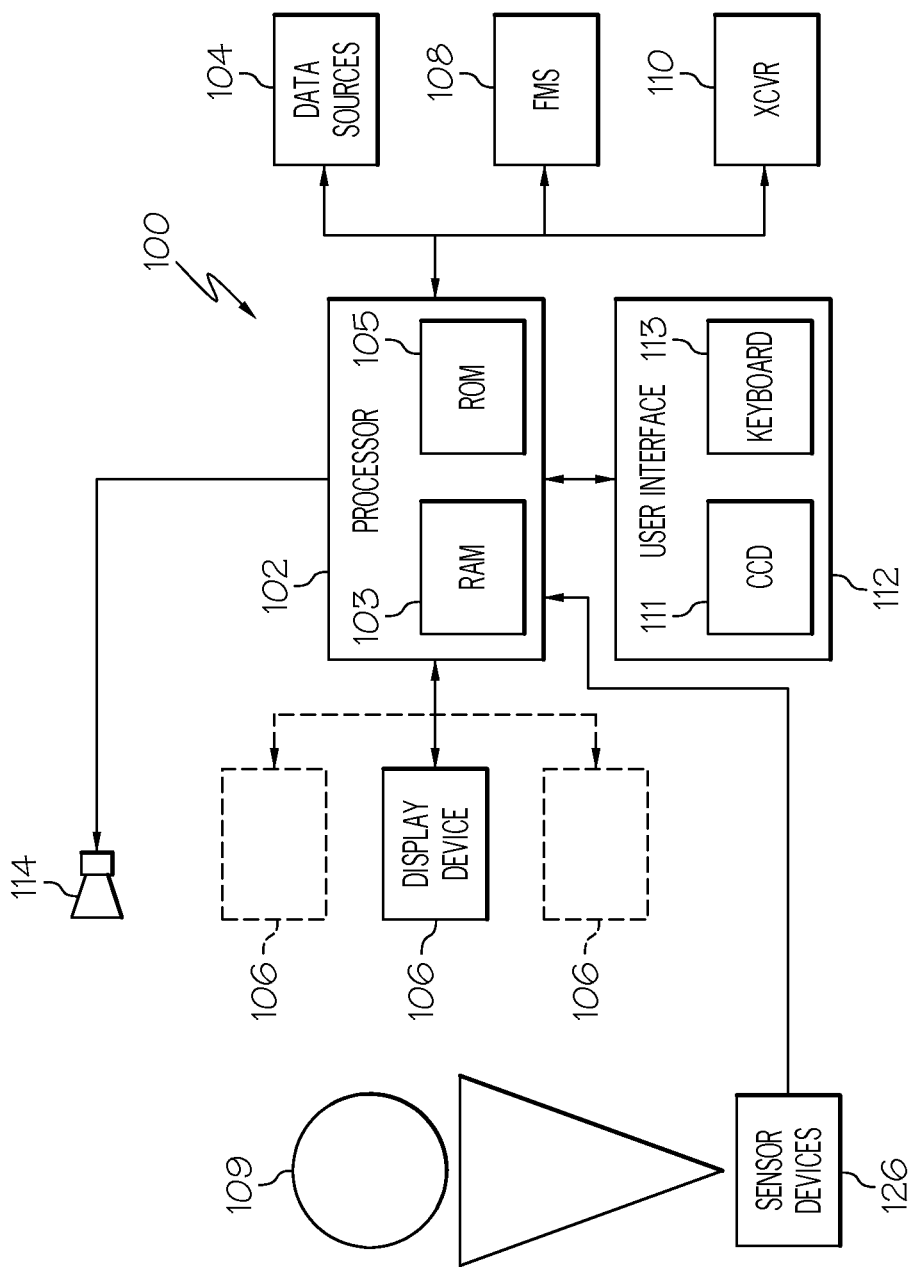
FIG. 1 depicts a functional block diagram of at least a portion of an example flight deck avionics system.

Turning to FIG. 1, at least a portion of an exemplary aircraft flight deck avionics system 100 is depicted and will now be described. A functional block diagram of an exemplary avionics display system 100 is depicted in FIG. 1, and includes a processor 102, a plurality of data sources 104, a display device 106, a flight management system (FMS) 108, and a transceiver 110. The processor 102 is in operable communication with the data sources 104 and the display device 106. The processor 102 is coupled to receive various types of aircraft data from the data sources 104, and may be implemented using any one (or a plurality) of numerous known general-purpose microprocessors or application specific processor(s) that operates in response to program instructions. In the depicted embodiment, the processor 102 includes on-board RAM (random access memory) 103, and on-board ROM (read only memory) 105. The program instructions that control the processor 102 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 102 may be implemented using various other circuits, not just a programmable processor. For example, digital logic circuits and analog signal processing circuits could also be used. In this respect, the processor 102 may include or cooperate with any number of software programs (e.g., avionics display programs) or instructions designed to carry out various methods, process tasks, calculations, and control/display functions described below.

The data sources 104 supply the above-mentioned aircraft data to the processor 102. The data sources 104 may include a wide variety of informational systems, which may reside onboard the aircraft or at a remote location. By way of example, the data sources 104 may include one or more of a runway awareness and advisory system, an instrument landing system, a flight director system, a weather data system, a terrain avoidance and warning system, a traffic and collision avoidance system, a terrain database, an inertial reference system, and a navigational database. The data sources 104 may also include mode, position, and/or detection elements (e.g., gyroscopes, global positioning systems, inertial reference systems, avionics sensors, etc.) capable of determining the mode and/or position of the aircraft relative to one or more reference locations, points, planes, or navigation aids, as well as the present position and altitude of the aircraft.

The display device 106 is used to display various images and data, in a graphic, iconic, and a textual format, and to supply visual feedback to the user 109. It will be appreciated that the display device 106 may be implemented using any one of numerous known displays suitable for rendering graphic, iconic, and/or text data in a format viewable by the user 109. Non-limiting examples of such displays include various cathode ray tube (CRT) displays, and various flat panel displays, such as various types of LCD (liquid crystal display), TFT (thin film transistor) displays, and OLED (organic light emitting diode) displays. The display may additionally be based on a panel mounted display, a HUD projection, or any known technology. In an exemplary embodiment, display device 106 includes a panel display. It is further noted that the system 100 could be implemented with more than one display device 106. For example, the system 100 could be implemented with two or more display devices 106.

No matter the number or particular type of display that is used to implement the display device 106, it was noted above that the processor 102 is responsive to the various data it receives to render various images on the display device 106. The images that the processor 102 renders on the display device 106 will depend, for example, on the type of display being implemented. For example, the display device 106 may implement one or more of a multi-function display (MFD), a three-dimensional MFD, a primary flight display (PFD), a navigation display (ND), a synthetic vision system (SVS) display, a vertical situation display (VSD), a horizontal situation indicator (HSI), a traffic awareness and avoidance system (TAAS) display, a three-dimensional TAAS display, and FMS display pages, just to name a few. Moreover, and as FIG. 1 depicts in phantom, the system 100 may be implemented with multiple display devices 106, each of which may implement one or more these different, non-limiting displays. The display device 106 may also be implemented in an electronic flight bag (EFB) and, in some instance, some or all of the system 100 may be implemented in an EFB.

The FMS 108 is configured, among other tasks, to allow the pilot 109 to input the flight plan for the aircraft. The flight plan may then be transmitted for display on one or more of the display devices 106. The pilot may also use the FMS to modify the flight plan in-flight, if needed or desired. The FMS 108 also receives data from various ones of the data sources 104 and determines the course that the aircraft should follow. The course may be flown manually by the pilot, or the aircraft flight director system can be set to fly the course.

The transceiver 110 is configured to receive at least textual datalink messages that are transmitted to the flight deck system 100 via, for example, modulated radio frequency (RF) signals. The transceiver 110 demodulates the textual datalink messages, and supplies the demodulated textual datalink messages to the processor 102. The textual datalink messages include data representative of various messages between ground stations (e.g., air traffic control stations) and the host aircraft, as well as between ground stations and other aircraft that may be within the same aircraft sector. The processor 102 further processes the textual datalink messages and, as will be described further below, selectively transfers information embedded within the datalink messages into the FMS 108. The processor 104 may also supply textual datalink messages to the transceiver 110, which in turn modulates the textual datalink messages and transmits the modulated textual datalink messages to, for example, an air traffic control station (not shown). In the depicted embodiment, the transceiver 110 is separate from the processor 102. However, it will be appreciated that the transceiver 110 could be implemented as part of the processor 102.

The depicted system 100 may also include a user interface 112 (graphical or otherwise) and one or more audio output devices 114. The user interface 112, if included, is in operable communication with the processor 102 and is configured to receive input from the pilot 109 and, in response to the user input, supply various signals to the processor 102. The user interface 112 may be any one, or combination, of various known user interface devices including, but not limited to, a cursor control device (CCD) 111, such as a mouse, a trackball, or joystick, and/or a keyboard, one or more buttons, switches, or knobs. In the depicted embodiment, the user interface 112 includes a CCD 111 and a keyboard 113. The pilot 109 uses the CCD 111 to, among other things, move a cursor symbol on the display device 106, and may use the keyboard 113 to, among other things, input textual data.

The audio output devices 114 may be variously implemented. No matter the specific implementation, each audio output device 114 is preferably in operable communication with the processor 102. The processor 102, other non-depicted circuits or devices, supplies analog audio signals to the output devices 114. The audio devices 114, in response to the analog audio signals, generate audible sounds. The audible sounds may include speech (actual or synthetic) or generic sounds or tones associated with alerts and notifications.

In addition to the functions described above, the system 100 is configured to support the transfer of information/data embedded in datalink messages of known message formats directly into the FMS 108. Depending upon the type of information that is embedded in the received datalink messages, the information may be transferred into the FMS 108 either automatically or in response to input from the pilot 109 via, for example, the user interface 112. In some embodiments, information in datalink messages of known formats, such as, for example, ATIS, SIGMET, AIRMET, NOTAMS, and METARS data, may be automatically transferred into the FMS 108, and be accompanied by feedback to pilot 109. This feedback may be variously implemented and may include varying levels of detail. For example, the feedback may be implemented using a relatively simple auditory notification that, via the audio output device 114, informs the pilot 109 that a datalink message (or at least selected portions thereof) has been automatically loaded into the FMS 108. Alternatively, the feedback may be implemented using a detailed textual presentation regarding exactly what information is being extracted from the datalink message and where it is being transferred into the FMS 108, or it may be implemented as a graphical representation of information such as airspace restrictions overlaid on a spatial representation of the flight path. In still other embodiments, the feedback may be implemented using various combinations of these feedback paradigms. The processor 102 is preferably configured to process the information included in the received datalink messages to determine the operational impact of the information and, based on this determination, the level of pilot intervention, which will in turn determine the type of the feedback to supply to the pilot.

The processor 102 determines the operational impact of received datalink messages by first parsing the incoming datalink messages. For datalink messages in a known format, such as ATIS, SIGMET, AIRMET, NOTAMS, and METARS, the messages are parsed into individual information elements. The information elements may then be extracted to populate parameters that can be compared to the host aircraft flight information. If the datalink message is in a free text format, the processor 102 may be configured to populate the parameters via any one of numerous known text analysis methods. Some non-limiting examples include text analyses that are commonly used by internet search engines to identify similar searches and display advertisements similar to a user's search terms. Other non-limiting text analysis techniques include log entropy-based statistical analysis and latent semantic indexing to compute relationships between key terms contained within the message, and subsequent comparison to the flight plan onboard the host aircraft.

The system 100 is preferably configured so that the pilot response to the feedback that is generated may vary, based on the type of information to be transferred to the FMS 108. For example, in some instances, such as when the information is needed quickly and the pilot 109 is cognitively overloaded, the information may be automatically transferred to the FMS 108, without relying on a response from the pilot 109. Although the type of information that may be automatically transferred may vary, one example of this type of information includes updated ATIS information. However, the pilot 109 is informed of the automatic transfer to the FMS 108 either audibly, visually, or both.

In other instances, the pilot 109 is relied upon to first approve a datalink message transfer into the FMS 108, either as a group of related messages or each individual message transfer. The pilot 109 is preferably presented with the information and message type (including free text) on the display device 106 to allow pilot review. To approve or disapprove of the transfer, the pilot 109 may, for example, supply a transfer approval signal or transfer disapproval signal to the processor 102, via the user interface 112. The processor 102 may also command the display device 106 to render updated FMS data in a highlighted manner. The types of information that may be transferred into the FMS 108 only after pilot approval include, but are not limited to, changes to active runways, altimeter setting, and barometer setting.

Some datalink messages include information that is updated fairly regularly. For example, datalink messages for METAR, ATIS, NOTAMS, etc. may include regularly updated information. The processor 102, at least in some embodiments, is further configured to compare the most recently received information to previously received information. The processor 102, in response to this comparison, may selectively command the display device 106 to depict the changes.

Some datalink messages may also include updated information that may affect secondary data that is calculated based on the received information. For example, a datalink message may include information that requires a new value for Top of Descent to be calculated. The processor 102 may, at least in some embodiments, be further configured to determine if the information in received datalink messages has such an impact and, if so, command the display device 106 to display an appropriate notification to the pilot 109. The processor 102 may also, in some embodiments, cause the audio device 114 to generate an audible notification. The processor 102 will then transfer the information (preferably both the datalink-based information and the new calculated secondary information, when appropriate) to the FMS 108 upon approval from the pilot 109 (e.g., appropriate input to, for example, the CCD or keyboard). With this functionality, the most salient affects of new datalink message data will be displayed to the pilot.

The system 100 is preferably configured to determine the impact of incoming information and, based on this determination, to further determine if the impact on current flight operations warrants pilot intervention (e.g. if NOTAM includes airspace restriction that intersects current flight plan). The processor 102 may also be configured, in some embodiments, to determine the optimum manner to present the information to the flight crew. For example, the processor 102 will determine whether information has a spatial component, such as a new clearance or airspace restriction, then select the appropriate display device 106 on which to render the new information.

It was noted above that in there may instances in which the information included in a received datalink message is needed quickly, yet the pilot 109 is cognitively overloaded. In such instances, the information may be automatically transferred to the FMS 108. It may thus be appreciated that in some embodiments, the processor 102 is further configured to estimate pilot cognitive workload level. It is noted that pilot cognitive workload level may be variously estimated. That is, it may be estimated from direct physiological sensing or indirect assessment from interaction with the flight deck. For example, the pilot 109 may have one or more cognitive workload sensor devices 126 located on his or her body, clothing, and/or other device (e.g., helmet, eye wear). The sensor devices 126, which may be variously implemented, are configured to sense and supply physiological data and/or contextual data and/or various other relevant data to the processor 102. The sensor devices 126 may be located on the body and/or clothing of the pilot 109, and/or on one or more other devices (e.g., helmet, eye wear) worn by the pilot 109. Alternatively, the sensor devices 126 may be disposed nearby the pilot 109.

It will be appreciated that the number and type of sensor devices 126 may vary. Some non-limiting examples of suitable physiological sensor devices 126 include an electroencephalogram (EEG) sensor, an electrocardiogram (ECG) sensor, an electro-oculogram (EOG) sensor, an impedance pneumogram (ZPG) sensor, a galvanic skin response (GSR) sensor, a blood volume pulse (BVP) sensor, a respiration sensor, an electromyogram (EMG) sensor, a pupilometry sensor, a visual scanning sensor, a blood oxygenation sensor, a blood pressure sensor, a skin and core body temperature sensor, a near-infrared optical brain imaging sensor, or any other device that can sense physiological changes in the pilot.

The EEG sensors monitor the pilot's and co-pilot's brain wave activity by sensing electrical potential at the scalp. Measurements by the EEG sensors are categorized into frequency bands, including delta, theta, alpha, and beta. For example, the delta band ranging from 1-4 Hz indicates a state of unconsciousness, the theta band ranging from 4-8 Hz indicates a state of daydreaming, the alpha band ranging from 8-13 Hz indicates an alert, but not mentally busy state, and the beta band ranging from 13-30 Hz indicates a state of higher thought process. Other frequency bands are possible. Based on the location of the EEG sensors, and the dominant frequencies detected, EEG data may help evaluate the type and amount of mental activity of the pilot 109. For example, if there are significant brain waves measured in the frontal brain, the pilot 109 may be actively manipulating information within their working memory. As a result, the EEG sensors may be used to measure the cognitive state of the pilot 109.

Other physiological sensors mentioned above include ECG sensors, EOG sensors, ZPG sensors, GSR sensors, pupilometry sensors, visual scanning sensors, blood oxygenation sensors, BVP sensors, EMG sensors, blood pressure sensors, and near-infrared optical brain imaging sensors. The ECG sensors measure heart rate by detecting electrical activity of the heart muscle. The EOG sensors measure eye movement by detecting electrical changes between the front and back of the eye as the eye moves. The ZPG sensors (or other type of respiration sensors) measure lung capacity and can be used to determine whether the pilot 109 is having difficulty breathing. The GSR sensors measure changes in conductivity of the skin caused by sweating and saturation of skin ducts prior to sweating. The pupilometry sensors measure pupil dilation to determine the level of engagement or interest in a task, or cognitive load of a task. The visual scanning sensors measure scanning behavior and dwell time to provide insight into visual attention. The blood oxygenation sensors sense oxygen levels in the blood. The BVP sensors measure heart rate by detecting changes in blood volume at a given location of the body. The EMG sensors measure currents associated with muscle action. The near-infrared optical brain imaging sensors measure brain function.

The sensor devices 126 may additionally include an accelerometer, an eye tracker, or any other device that can sense contextual data. The sensor devices 126 may be commercial off-the-shelf devices or custom designed. The accelerometers, if included, measure the rate at which an object is moving, the acoustic sensors, if included, measure the loudness and frequency of ambient sounds, and the eye trackers, if included, measure pupilometry and/or visual scanning behavior. Data from the accelerometers may be used to measure head movement such as yaw, pitch, and roll. Data from the eye trackers may be used to infer cognitive state from pupil dilation response and to infer visual attention indices from dwell time and scanning patterns.

No matter the specific number and type of sensor devices 126 used, each sensor devices 126 supplies data representative of the measured stimuli to the processor 102. It will be appreciated that the data may be transmitted to the processor 102 wirelessly or via hard-wired connections, and that the data may be modified, prior to transmission, to format the data as needed. The processor 102, upon receipt of the sensor data, estimates at least the cognitive workload level of the pilot 109. It will be appreciated that the cognitive workload level may be estimated using any one of numerous known methods. An example of one particular methodology is disclosed in U.S. Pat. No. 7,454,313, entitled "Hierarchical Workload Monitoring for Optimal Subordinate Tasking," which is assigned to the assignee of the instant invention.

The processor 104 may also, or instead, receive data from aircraft sensors (e.g., altitude, speed, heading), data from aircraft systems (e.g., TCAS, FMS), and various other data types (e.g., phase of flight, pilot experience, etc), and use these data, in addition to or instead of the data from the sensor devices 126, to determine current and future pilot cognitive workload level. Moreover, the processor 102 may be configured to estimate current and future pilot cognitive workload level from secondary (i.e., non-direct) sources, such as tracking response times to various stimuli (e.g., alerts) or performance on tasks.

The general methodology of the implemented in the avionics system 100 for handling datalink messages that was described above is depicted in flowchart form in FIG. 2. For completeness, a description of this method 200 will now be provided. In doing so, it is noted that the parenthetical references refer to like-numbered flowchart blocks.

Figure 2:
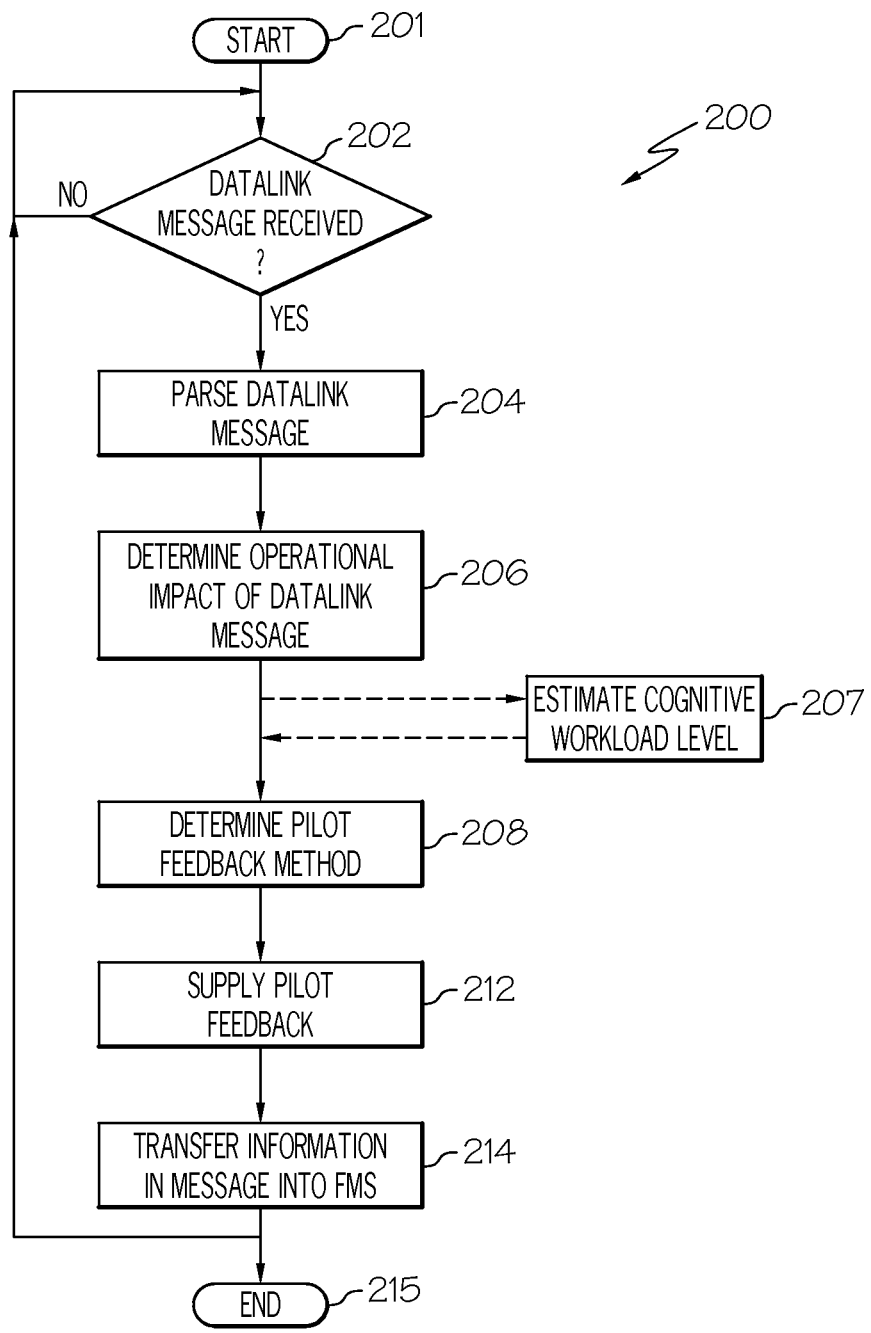
FIG. 2 depicts a process, in flowchart form, that may be implemented in the aircraft flight deck avionics system of FIG. 1

The method 200 begins by awaiting the receipt of a datalink message (202). As noted above, a received datalink message may be one that is transmitted to, and associated with, the aircraft in which the system 100 is installed, or it may be transmitted to, and associated with, another aircraft. In either case, when a datalink message is received, it is supplied to the processor 102. The processor 102 then parses the datalink message (204), determines its operational impact (206), and determines the method of supplying pilot feedback (208). As FIG. 2 depicts in phantom, the method 200 may also include estimating the pilot cognitive workload level (207), prior to determining the pilot feedback method. Whether or not pilot cognitive workload level is estimated, the pilot feedback is supplied (212), and the information (or at least selected portions thereof) in the datalink message is transferred into the FMS (214).

Those skilled in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention.

What is claimed is:

1. A method for transferring datalink-based information into an aircraft flight management system, comprising the steps of:
   receiving a datalink message in an aircraft;
   parsing the received datalink message into individual information elements;
   determining, from the individual information elements, the operational impact of the received datalink message on the aircraft;
   determining, from the determined operational impact, a method of supplying pilot feedback regarding the received datalink message;
   supplying the pilot feedback regarding the received datalink message using the determined method; and
   selectively transferring at least selected portions of the individual information elements into the aircraft flight management system (FMS).

2. The method of claim 1, wherein the method of supplying pilot feedback comprises generating an auditory notification.

3. The method of claim 1, wherein the method of supplying pilot feedback comprises rendering the at least a portion of the datalink message on a display device.

4. The method of claim 3, further comprising:
   selecting, based on the determined operational impact, a display device on which to render the at least a portion of the datalink message.

5. The method of claim 3, wherein the step of rendering comprises rendering a textual representation of the at least a portion of the datalink message.

6. The method of claim 3, wherein the step of rendering comprises rendering a graphical representation of the at least a portion of the datalink message.

7. The method of claim 1, wherein the method of supplying pilot feedback comprises:
   generating an auditory notification; and
   rendering at least a portion of the datalink message on a display,
   wherein spatial datalink message elements are rendered on one or more appropriate displays.

8. The method of claim 1, wherein the step of selectively transferring at least selected portions of the individual information elements comprises:
   automatically transferring the at least selected portions of the individual information elements into the FMS.

9. The method of claim 1, wherein the step of selectively transferring at least selected portions of the individual information elements comprises:
   receiving a transfer approval from a pilot; and
   upon receipt of the transfer approval, transferring the at least selected portions of the individual information elements into the FMS.

10. The method of claim 1, further comprising:
    estimating pilot cognitive workload level; and
    determining the method of supplying the pilot feedback regarding the received datalink message additionally from the estimated pilot cognitive workload level.

11. An avionics system, comprising:
    a receiver configured to receive a datalink message; and
    a processor in operable communication with the receiver and configured to:
        parse each of the received datalink message into individual information elements;
        determine, from the individual information elements, the operational impact of the received datalink message on the aircraft;
        determine, from the determined operational impact, a method of supplying pilot feedback regarding the received datalink message; and
        selectively transfer at least selected portions of the individual information elements into the aircraft flight management system (FMS).

12. The system of claim 11, wherein:
    the determined method of supplying pilot feedback comprises generating an auditory notification;
    the processor is further configured to generate an auditory notification signal; and
    the system further comprises an audio output device coupled to receive the auditory notification signal and configured, upon receipt thereof, to generate an auditory notification.

13. The system of claim 11, wherein:
the method of supplying pilot feedback comprises rendering the at least a portion of the datalink message on a display device;
the processor is further configured to generate image rendering display commands; and
the system further comprises a display device coupled to receive the image rendering display commands and configured, upon receipt thereof, to render an image representative of at least a portion of the received datalink message.

14. The system of claim 13, wherein the processor is further configured to:
select, based on the determined operational impact, a display device on which to render the at least a portion of the datalink message.

15. The system of claim 13, wherein the image rendering display commands cause the display device to render a textual representation of the at least a portion of the datalink message.

16. The system of claim 13, wherein the image rendering display commands cause the display device to render a graphical representation of the at least a portion of the datalink message.

17. The system of claim 11, wherein:
the determined method of supplying pilot feedback comprises generating an auditory notification;
the processor is further configured to generate an auditory notification signal and image rendering display commands; and
the system further comprises an audio output device and a display device;
the audio output is coupled to receive the auditory notification signal and is configured, upon receipt thereof, to generate an auditory notification; and
the display device is coupled to receive the image rendering display commands and is configured, upon receipt thereof, to render an image representative of at least a portion of the received datalink message.

18. The system of claim 11, wherein the processor is configured to automatically transfer the at least selected portions of the individual information elements into the FMS.

19. The system of claim 11, wherein:
the system further comprises a user interface configured to receive input from a user and configured, upon receipt thereof, to generate a transfer approval signal; and
the processor is coupled to receive the transfer approval signal and is configured, upon receipt thereof, to transfer the at least selected portions of the individual information elements into the FMS.

20. The system of claim 11, wherein:
the system further comprises a plurality of workload sensors, each workload sensor configured to (i) sense a parameter representative of pilot cognitive workload level and (ii) supply sensor data representative thereof to the processor; and
the processor is further configured to (i) estimate pilot cognitive workload level from the sensor data and (ii) determine the method of supplying the pilot feedback regarding the received datalink message additionally from the estimated pilot workload level.

* * * * *